Figure 1:
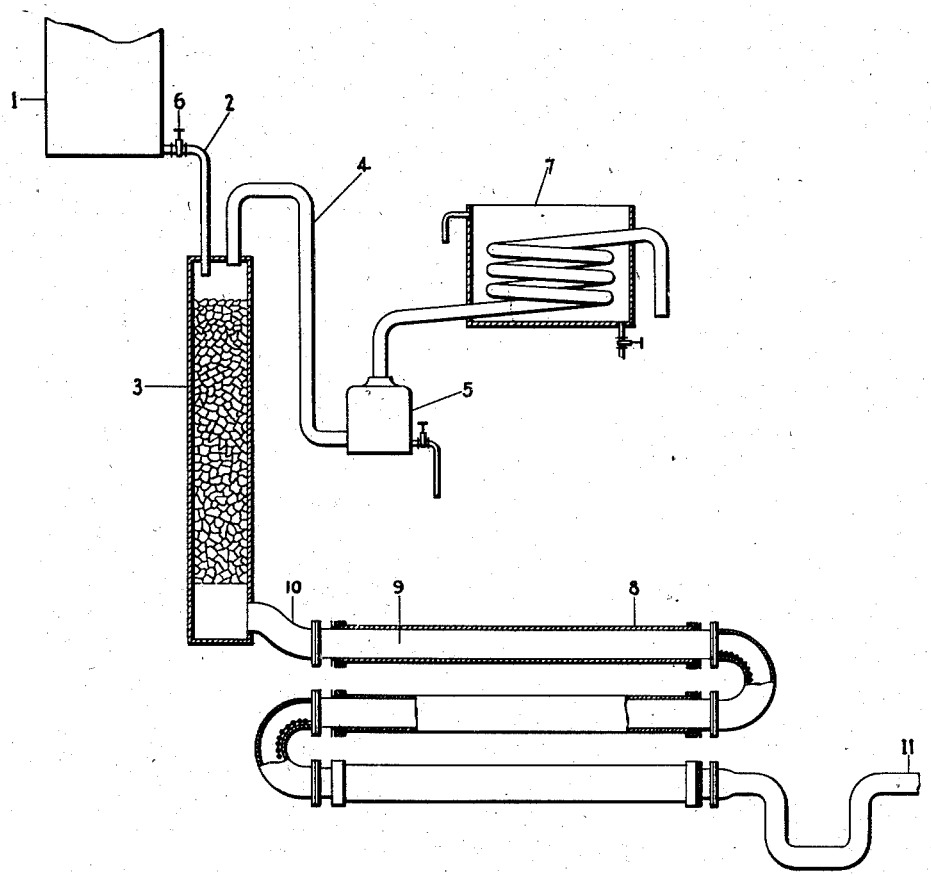

Patented Aug. 15, 1933

1,922,278

UNITED STATES PATENT OFFICE 1,922,278

PROCESS OF CONCENTRATING NITRIC ACID

Clark W. Davis, Swarthmore, Pa., and Stanley L. Handforth and William E. Kirst, Woodbury, N. J., assignors to E. I. du Pont de Nemours & Company, Wilmington, Del., a Corporation of Delaware Application October 8, 1929. Serial No. 398,148

3 Claims. (Cl. 23—160)

This invention relates to an improved process for concentrating nitric acid and more particularly to a continuous process in which a dehydrating agent is used. This invention is also applicable to the denitration of certain kinds of waste acids with the production of strong nitric acid.

In order to produce strong nitric acid from weak acid some form of dehydrating agent is required. For this purpose sulfuric acid has been the most commonly used material. Other dehydrating agents, however, such as calcium nitrate or phosphoric acid may be used.

It is well known that weak nitric acid and a dehydrating agent may be mixed and boiled in a vessel or retort to produce strong nitric acid. In such a process the first nitric acid obtained is strong, but towards the end of the distillation the resulting acid becomes increasingly weak. There is the further disadvantage that the process is not continuous.

Pauling (U. S. Patent 1,031,865) has described a process in which the mixture of weak nitric acid and dehydrating agent is fed into the top of a tower while steam is blown in through the bottom of the tower counter-current to the down-flowing mixture. According to his process, strong nitric acid may be obtained from the top of the tower by condensing the resulting vapors, and diluted and denitrated dehydrating agent may be obtained from the bottom of the tower. While Pauling's process as described is continuous, the steam dilutes the dehydrating agent to such an extent that an excessive amount of the dehydrating agent must necessarily be used, since it is not practical to attempt to denitrate a solution when the concentration of the dehydrating agent falls below a certain minimum value. The main function of the dehydrating agent is to hold the water, and the introduction of steam as a source of heat has the same effect as far as the strength of the residual is concerned as diluting with water the weak nitric to be concentrated.

The process disclosed by Zeisberg (U. S. Patent 1,197,167) overcomes these objections to a considerable extent by boiling the dilute dehydrating agent in a vessel at the bottom of the tower and utilizing the resulting vapors to heat the mixture of nitric acid and dehydrating agent flowing down the tower. This results in obtaining a less dilute dehydrating agent from the process as the dehydrating agent is partially concentrated in the boiling vessel. However, the proportion of the dehydrating agent cannot be reduced as the action of the tower will be substantially the same in both of these processes, and the minimum dilution will be at the bottom of the tower in the latter process before the liquid enters the boiling vessel.

It has been proposed to pass hot inert gases through the tower to heat the liquid, but this results in the decomposition of some of the nitric acid, and furthermore, introduces a serious difficulty in recovering the nitric acid vapors from the inert gases.

It has been proposed by Strzoda (German Patents 366,158 and 368,466) and by the Chemical Construction Company, (French Patent 656,108) to overcome these difficulties and produce a continuous process by allowing the dilute acid and dehydrating agent to flow down a cascade system heated externally by means of hot gas or a liquid heating medium. In these processes, strong nitric acid is obtained from the mixture boiling in the top of the cascade. Weak nitric vapor is given off in the bottom portion of the cascade system. This latter is partially concentrated by being absorbed in the liquid in the upper part of the cascade but since only poor contact can be obtained in this apparatus between the gas and the liquid, either a nitric acid distillate of lower strength is obtained, or more than the minimum amount of dehydrating agent necessary must be used.

Frischer, in British Patent 281,691 and also Chemical Construction Company in a modification of their process propose to overcome these objections by externally heating a fractionating column down which the mixture flows and in which good contact is obtained between the liquid and gas. These methods, however, require complicated apparatus both difficult to construct and to maintain.

The present invention has as an object the production of nitric acid of maximum strength in a continuous process. A further object is the use of a minimum amount of dehydrating agent. A still further object is an apparatus which is simple to construct and easy to maintain. Still another object is the obtaining of the dehydrating agent free of nitric acid and containing only the water which was originally present in the dilute nitric acid concentrated.

These objects are accomplished by feeding the mixture of nitric acid and dehydrating agent to the top of a counter-current apparatus or fractionating tower. In all places where a tower is referred to it is understood to be properly supplied with packing material or fractionating plates since it is apparent to one skilled in the art that an empty tower would be useless for the purpose in mind. We do not intend to limit ourselves as regards feeding a mixture of weak nitric and dehydrating agent since these may also be fed separately and allowed to mix in the tower. Weak nitric vapors rising from a series or cascade of boiling vessels enter the bottom of the tower counter-current to the liquid flowing down the tower. The boiling vessels are heated externally by means of hot gases or a hot circulating liquid. The weak nitric vapors from these boiling vessels flow upward through the tower counter-current to the liquid flowing down the tower and the dehydrating agent absorbs and condenses the water from these weak nitric vapors. The heat liberated in this way causes vaporization of the nitric acid from the mixture. The mixture by the time it has reached the bottom of the tower has lost a large percentage of its nitric acid. It then enters the boiling vessels and successively loses more and more of its nitric content until it issues from the last of the series free of nitric acid. The vapors rising from the liquid in the boiling vessels flow upward through these, counter-current to the liquid so that a slight increase in vapor strength may occur due to contact of the weaker vapors with liquid which will give off stronger vapors. In this way intimate contact is obtained in a part of the apparatus and exceedingly strong nitric acid can be produced. The principal function of the heated vessels is to supply heat and complete denitration, and they are not relied on for fractionation, this being supplied by the tower. Thus no steam need be added so that no extra diluting of the dehydrating agent takes place. If a feed mixture is used which contains more than 20% nitric and less than 21 to 22% water, only strong nitric vapors are obtained from the top of the tower.

In the accompanying drawings Figure 1 shows one illustrative method of carrying out our invention. Other methods and types of construction within the scope of our invention will naturally suggest themselves to those skilled in the art. In the drawings, a mixture of weak nitric acid and dehydrating agent is fed from vessel 1 through conduit 2 to the top of the fractionating tower 3. The flow is regulated by means of valve 6. The strong nitric vapor arising from the tower is led through conduit 4 and passes through chamber 5, counter-current to the condensed nitric acid from the condenser 7, its purpose being to remove lower oxides of nitrogen from the condensate. The liquid leaving the bottom of the tower, still containing appreciable quantities of nitric acid, enters a series of elongated vessels 8. These are surrounded by jackets 9 through which steam or hot liquid may be circulated so as to boil the acid within the vessels. The acid overflows from one vessel to the next after traversing its length. The nitric acid content of the mixture is successively reduced in the vessels by boiling so that it leaves the last one practically free of nitric acid. The weak nitric acid vapors arising from the lower boiling vessels may be partially concentrated by coming in contact with the stronger liquid in the upper boiling vessels, although this is not necessary. The weak nitric vapors arising from the series of boiling vessels enter the tower through the same or a different conduit 10 than that through which the liquid flows down. These vapors coming into contact with the stronger liquid flowing down the tower heat this liquid, driving off strong nitric vapors from it while at the same time the dehydrating agent absorbs the water from the weak nitric vapors, so that only strong nitric acid is obtained from the top of the tower. The heat for vaporizing nitric acid comes from the latent heat of the absorbed steam. The diluted dehydrating agent finally leaves the system substantially free of nitric acid through outlet 11.

The tower may be any type of acid fractionating tower. It may either be constructed of acid resistant iron or chemical-ware filled with a suitable packing material or fractionating plates to give the necessary scrubbing action. While jacketed boiling tubes are shown, these may be tubes placed in a furnace and directly heated, or a series of pot type boiling vessels may be used, heated by steam or hot circulating liquid or by direct fire, so long as a series are provided whereby the remaining nitric vapors may be driven off and passed counter-current to the on-coming liquids.

Figure 2:
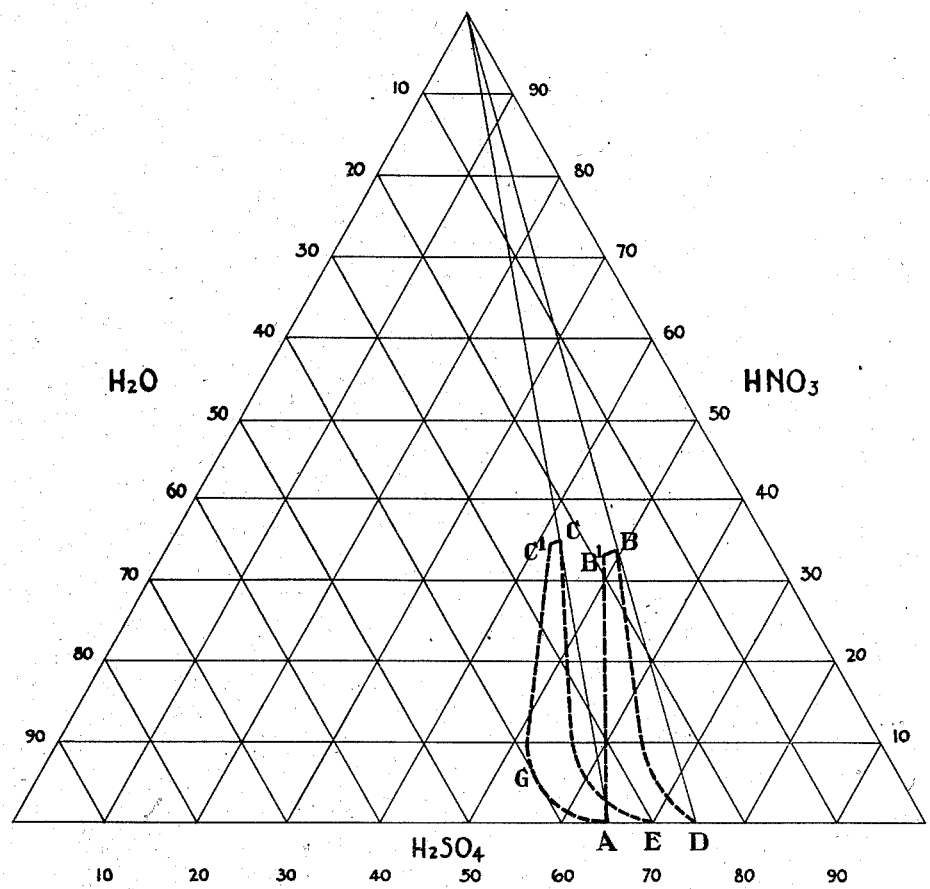

The change in composition in a three component system such as water, nitric and sulfuric acids can be well illustrated graphically by means of triangular coordinates. The different processes are compared graphically by this means in Figure 2. When using sulfuric acid for example, as the dehydrating agent, final denitration probably will not take place on boiling at atmospheric pressure if the strength of the residual sulfuric is much below 65%. For practical purposes it is necessary to maintain a strength somewhat above this. Point "A" represents this strength sulfuric. The dotted lines represent the trajectories of distillation for the different processes. In other words, the composition of the liquid phase will change during the process as represented by the dotted lines. In the process of U.S. Patent to Pauling (1,031,865), the trajectory follows a line nearly parallel to line BB'A, so that in order to reach a final composition of A, it is necessary to start with mixture B. The section of the trajectory BB', and in the second case CC', represents the change in composition which takes place in bringing the cold concentrating mixture to the boiling point, the boiling actually starting at B' and C' respectively.

In our process, we can reach final mixture "A" by starting with mixture C, which requires less sulfuric acid per pound of nitric acid. The first part of the trajectory then follows line CC'GA parallel to BB'A, as far as point G. At G the liquid leaves the tower and enters the cascade system and the trajectory then follows line GA. The total result is then line CA and a strong nitric acid distillate is obtained from the system.

In the process disclosed by Zeisberg (U. S. Patent 1,197,167), we again have trajectory BB'A with the added step AD taking place in the single boiling vessel. Again we have to start with mix B, containing excess sulfuric acid, as we have to follow BB'A to point A and cannot obtain denitration at sulfuric concentrations lower than A.

In the cascade system disclosed by Strzoda and in a modification of French Patent 656,108, starting with mix C, the trajectory will be approximately line CE, the result being the removal of a weaker nitric acid distillate than is obtained by the process represented by line CC'GA, or in other words, CA. If it is attempted to start with a still weaker mixture, a still weaker nitric distillate will be obtained. In order to obtain a strong nitric distillate, an excess of dehydrating agent or in most cases sulfuric acid, must be used. In this case a steeper distillation trajectory similar to BD will be obtained.

We claim:

1. The process of concentrating nitric acid which comprises passing a mixture of nitric acid and a dehydrating agent down through a dehydrating tower, driving off therefrom strong nitric acid vapors, passing the residual mixture still containing some nitric acid through a series of boiling vessels forming a cascade, vaporizing weak nitric acid in the cascade, and retaining all the weak nitric vapors from the boiling vessels in the system by returning them to the dehydrating tower.

2. The process of concentrating nitric acid which comprises passing a mixture of nitric acid and a dehydrating agent down through a dehydrating tower, driving off therefrom strong nitric acid vapors, passing the residual mixture still containing some nitric acid through a series of boiling vessels forming a cascade, and retaining all the weak nitric vapors in the system by returning them to the dehydrating tower through the series of boiling vessels in counter-current contact flow with the oncoming mixture of liquids.

3. The process of concentrating nitric acid which comprises passing a mixture of nitric acid and a dehydrating agent down through a dehydrating tower, driving off therefrom strong nitric acid vapors, passing the residual mixture still containing some nitric acid through a series of boiling vessels forming a cascade, and retaining all the most dilute nitric acid vapors together with the stronger vapors from the uppermost boiling vessels in the system by returning them to the dehydrating tower in counter-current contact flow with the oncoming mixture of liquids.

CLARK W. DAVIS.
STANLEY L. HANDFORTH.
WILLIAM E. KIRST.